US006236470B1

(12) United States Patent
Seachman

(10) Patent No.: US 6,236,470 B1
(45) Date of Patent: May 22, 2001

(54) REFLECTOR AND LIGHT SOURCE REGISTRATION DEVICE FOR A DOCUMENT ILLUMINATOR

(75) Inventor: Ned J. Seachman, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 08/359,089

(22) Filed: Dec. 19, 1994

(51) Int. Cl.[7] .................................................. H04N 1/40
(52) U.S. Cl. .............................................. 358/471; 358/474
(58) Field of Search .................................. 358/471, 474, 358/475; 362/327, 341, 347, 319

(56) References Cited

U.S. PATENT DOCUMENTS

| 3,851,201 | 11/1974 | Orrvick et al. ................. 313/113 |
| 3,868,182 | 2/1975 | Kidd ................................. 355/67 |
| 4,072,417 | 2/1978 | Motomura ........................ 355/67 |
| 4,218,127 | 8/1980 | Costanza et al. ................. 355/8 |
| 4,704,638 | * 11/1987 | Igarashi .......................... 358/484 |
| 4,839,730 | * 6/1989 | Shirakoshi et al. ............. 358/483 |
| 5,101,282 | * 3/1992 | Honma ............................ 358/474 |
| 5,194,898 | 3/1993 | Costrop et al. ................. 355/236 |
| 5,280,368 | * 1/1994 | Fullerton ........................ 358/474 |
| 5,335,158 | * 8/1994 | Kaplan et al. .................. 362/303 |

OTHER PUBLICATIONS

James J. Appel et al.; "Full Frame Array Lens Illuminator"; vol. 11, No. 1; Jan./Feb. 1986; pp. 31–32 Xerox Disclosure Journal.

* cited by examiner

Primary Examiner—Thomas D. Lee
(74) Attorney, Agent, or Firm—Michael J. Nickerson

(57) ABSTRACT

An illumination system includes a platen upon which a document rests. The document is irradiated directly by light from a light source and indirectly by light reflected from an opposing reflector. The light reflected from the document passes through an opening or slit in the illumination registration device. The opposing reflector and light source are attached to an illumination system registration device. The illumination system registration device includes an opposing reflector locating surface and a lamp locating feature for providing proper registration and alignment between the light source and the opposing reflector. The opposing reflector locating surface is shaped in the same shape as the opposing reflector.

28 Claims, 2 Drawing Sheets

REFLECTOR AND LIGHT SOURCE REGISTRATION DEVICE FOR A DOCUMENT ILLUMINATOR

FIELD OF THE PRESENT INVENTION

The present invention is directed to a device for registering the position between a reflector and a light source in an illumination system. More specifically, the present invention is directed to a single unitary device for registering the positional relationship between a reflector and a light source in a document illumination system.

BACKGROUND OF THE PRESENT INVENTION

Conventionally, illumination systems or devices which are used to scan documents typically include an illumination source such as a tungsten lamp or fluorescent lamp and an opposing reflector. More specifically, in conventional systems, the illumination source would be located on one side of an optical center line of the scanner under a platen or constant velocity transport (CVT) system while the reflector would be positioned on the opposite side of the optical center line of the scanner under the platen or CVT system. Thus, the illumination source, in conjunction with the opposing reflector, would provide proper illumination of the document or object being scanned by the scanner. It is noted that document and object, in the present specification, are interchangeable and refer to the physical object that is being scanned.

The opposing reflector serves two distinct purposes in an illumination system as described above. The first purpose is to redirect light which would have normally missed the document back to the illuminated region of the document, thereby significantly increasing the total irradiance impinging upon the document without additional input power being applied to the lamp or light source. Moreover, the opposing reflector suppresses shadowing due to paste-ups or other surface irregularities on the document by supplying light from an angle opposite the angle corresponding to the light being directly contributed by the lamp. An example of such a conventional system is illustrated in FIG. 1.

FIG. 1 illustrates the document illumination components in a conventional scanner which can be utilized as a stand alone scanner or in a copier. Moreover, the illumination system illustrated in FIG. 1 may be utilized in either a light lens scanning system or a digital (image input terminal) scanning system (platen or CVT) so as to properly illuminate the document for reproduction, display, and/or storage in an electronic memory, magnetic medium, or optical disk. The illumination system of FIG. 1 includes a platen 3 upon which a document 1 rests. The document 1 is illuminated by a light source 7 which provides an active source of light to irradiate the illuminated region of the document. Typically, this source of light is provided by a linear fluorescent lamp (with or without aperture reflecting coatings 8 on the interior lamp surface to form an aperture), or by linear tungsten lamps. As noted above, the light source 7 is situated on one side of an optical center line 6. An imaging system (not shown) causes an image of the portion of the document immediately surrounding this optical centerline 6 to be projected onto a linear array of photosensors (full width array sensor) (not shown), a CCD sensor (not shown), or a photoreceptor (not shown).

On the opposite side of the optical center line 6, an opposing reflector 5 is situated. The opposing reflector 5 provides indirect illumination to the document being scanned by redirecting light which would normally not illuminate the document (light leaving the light source in a parallel or substantially parallel path with respect to the platen 3) back to the illuminated region of the document. Moreover, the opposing reflector 5 reflects light back to the document at an angle opposite from the angle of light being directly contributed by the light source 7. This reflection suppresses shadowing on documents with paste-up or other nonplanar surface features.

Conventionally, the opposing reflector 5 is formed from extruded aluminum or a formed piece of aluminum sheet stock. A highly reflective finish is then applied, by polishing and optionally the application of special coatings, to the aluminum to provide the reflective surface of the opposing reflector 5. It is further noted that the opposing reflector 5 may have a thin flat glass mirror attached to its surface to improve reflectivity. However, such a thin flat glass mirror limits the surface to having an essentially flat profile.

Examples of conventional document illumination systems are disclosed in U.S. Pat. No. 3,851,201; U.S. Pat. No. 3,868,182; U.S. Pat. No. 4,072,417; U.S. Pat. No. 4,218,127; and "Full Frame Array Lens Illuminator," Xerox Disclosure Journal, Volume 11, Number 1, January/February 1986. The entire contents of these U.S. patents and article are hereby incorporated by reference.

Although the conventional illumination systems provide adequate illumination for a scanner, various problems are associated with conventional illumination systems. One such problem is the mechanical tolerances required for obtaining proper reflector to lamp alignment in the scanner. More specifically, the alignment between the opposing reflector and light source must be precisely set and maintained to provide the desired illumination efficiency and profile on the document for proper scanning.

Another problem with conventional illumination systems is their reflective efficiency and left to right illumination balance. More specifically, the reflectors in conventional illumination systems utilizing polished aluminum with special coatings typically have a reflectance value of less than 70%. Thus, the opposing reflector in the conventional illumination system has a reflective efficiency of less than 70%. This efficiency has a direct effect upon the left to right illumination balance of the illumination system.

For example, it is desirable to maximize the irradiance at the document at the optical center line, and simultaneously receive nearly equal irradiance contributions from the lamp and reflector sides. If the reflectance value of the opposing reflector is reduced, the overall irradiance as well as the reflector side irradiance contribution are correspondingly reduced for a given illuminator design. This adversely impacts both the total illuminator efficiency as well as the side-to-side balance. Clearly, achieving a reflectance value of the opposing reflector surface as close to 100% as possible not only improves the overall illuminator efficiency but also improves the ability to achieve equal irradiance contributions from each side of the optical center line.

A third problem with conventional illumination systems is the repairing and maintenance of these illumination systems. More specifically, when an opposing reflector is damaged, the aluminum reflector must be either replaced or removed, repolished, and re-coated and placed back into the illumination system so as to restore the illumination system to its original performance. Thus, the repairing of the conventional illumination system can be complicated and costly.

Therefore, it is desirable to provide an illumination system for a scanner which meets tight mechanical tolerances required for maintaining proper reflector to lamp alignment, has high reflective efficiency so as to realize optimum left to right illumination balance, and a simplified design to reduce the complexity and cost of repairing of such an illumination system.

SUMMARY OF THE INVENTION

One aspect of the present invention is an illumination registration device. The illumination registration device includes a body having an opposing reflector location surface. The body also has a light source location surface and an opening positioned between the opposing reflector location surface and the light source location surface. The opening enables light reflected from a document to pass therethrough.

Another aspect of the present invention is a document scanner. The document scanner includes an illumination registration member including an opposing reflector location surface, a light source location surface, and an opening positioned between the opposing reflector location surface and the light source location surface. The opening enables light reflected from a document to pass therethrough. A light source abuts the light source location surface. The document scanner also includes a reflective tape abutting the opposing reflector location surface.

A third aspect of the present invention is a copier. The copier includes an illumination registration member including an opposing reflector location surface, a light source location surface, and an opening positioned between the opposing reflector location surface and the light source location surface. The opening enables light reflected from a document to pass therethrough. A light source abuts the light source location feature The copier also includes a reflective tape abutting the opposing reflector location surface. A photosensitive member is located to receive the image of light reflected from a document residing on the transparent platen after passing through the opening. The copier further includes means for reproducing the image corresponding to the light received by the photosensitive member.

Further objects and advantages of the present invention will become apparent from the following descriptions of the various embodiments and characteristic features of the present invention.

BRIEF DESCRIPTION OF THE DRAWINGS

The following is a brief description of each drawing used to describe the present invention, thus, are being presented for illustrative purposes only and should not be limitative of the scope of the present invention, wherein.

DETAILED DESCRIPTION OF THE PRESENT INVENTION

Figure 1:
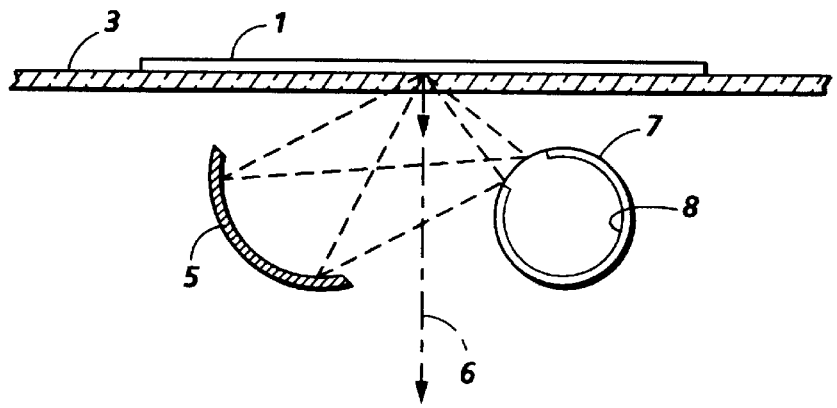
FIG. 1 illustrates a side view of the components of a conventional illumination system for a document scanner.

The following will be a detailed description of the drawings illustrated in the present invention. In this description, as well as in the drawings, like references represent like devices performing equivalent functions.

Figure 2:
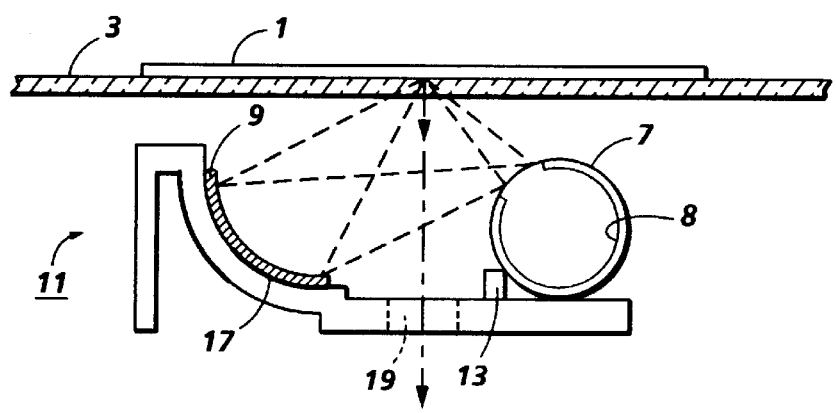
FIG. 2 illustrates a side view of one embodiment of an illumination system for a document scanner according to the present invention.

FIG. 2 illustrates an illumination system for a document scanner according to the concepts of the present invention. In FIG. 2, an illumination system includes a platen 3 upon which a document 1 rests. The document 1 is irradiated directly by light from light source 7 through an aperture device 8 and indirectly by light reflected from an opposing reflector 9. The opposing reflector 9 and light source 7 are attached to an illumination system registration device 11.

The light reflected from the document 1 passes through an opening or slit 19 in the illumination registration device 11. Upon passing through the opening 19, the reflective light passes onto an optical system that produces an image of the document upon either CCD sensors, a full-width array sensor, a photoreceptor, or any other photosensitive material which can be utilized in recording the image being scanned on the document 1. The illumination system registration device 11 also includes an opposing reflector locating surface 17 and a lamp locating feature 13 for providing proper registration and alignment between the light source 7 and the reflector 9. Mechanical supporting means (not shown) maintain the positional relationship between the platen 3 and the illuminator registration device 11. In such a system, the illumination registration device 11 may include surfaces, protrusions, or indentations located elsewhere on the illumination registration device 11 to register the illumination system to a frame of a constant velocity transport scanning system or to register the illumination system to a carriage or carriage rails of a full rate/half rate scanning system.

Figure 3:
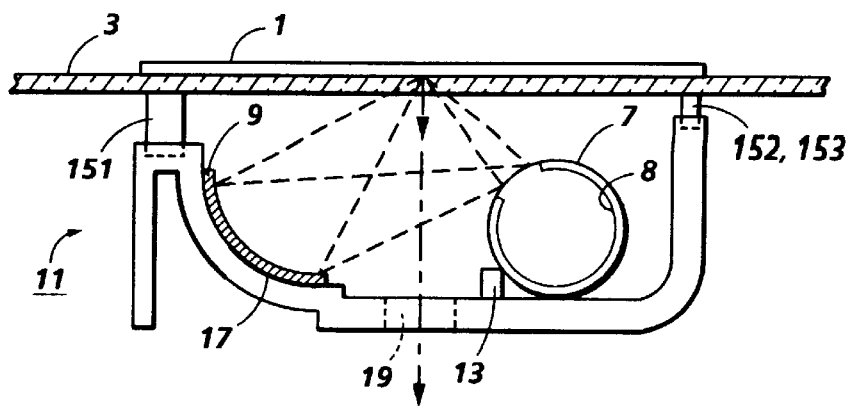
FIG. 3 illustrates a side view of another embodiment of the illumination system for a document scanner according to the present invention.

FIG. 3 illustrates another illumination system for a document scanner according to the concepts of the present invention. The structure and construction of the illumination device of FIG. 3 are substantially the same as described above with respect to FIG. 2, except for the ride-on platen registration pads 151, 152, and 153. These ride-on platen registration pads 151, 152, and 153 are located on the illuminator registration device 11 at three non-collinear positions and allow the illumination system to remain registered to the platen while also allowing the illumination system to slide across or ride-on the platen. The illumination registration device 11 includes indentations, receptors, or openings in its structure for the location of these pads wherein the indentations, receptors, or openings are at the proper depth and location to enable the ride-on system. An example of such a ride-on system is disclosed in U.S. Pat. No. 5,194,898. The entire contents of U.S. Pat. No. 5,194,898 are hereby incorporated by reference.

It is noted that if the embodiment illustrated in FIG. 3 is utilized in a nonride-on system, the illumination registration device 11 may include surfaces, protrusions, or indentations located elsewhere on the illumination registration device 11 to register the illumination system to a frame of a constant velocity transport scanning system or to register the illumination system to a carriage of a full rate/half rate scanning system. In other words, these surfaces, protrusions, or indentations can be included in the illumination registration device 11 to enable proper registration for the scanning of the document in the scanning system.

Figure 4:
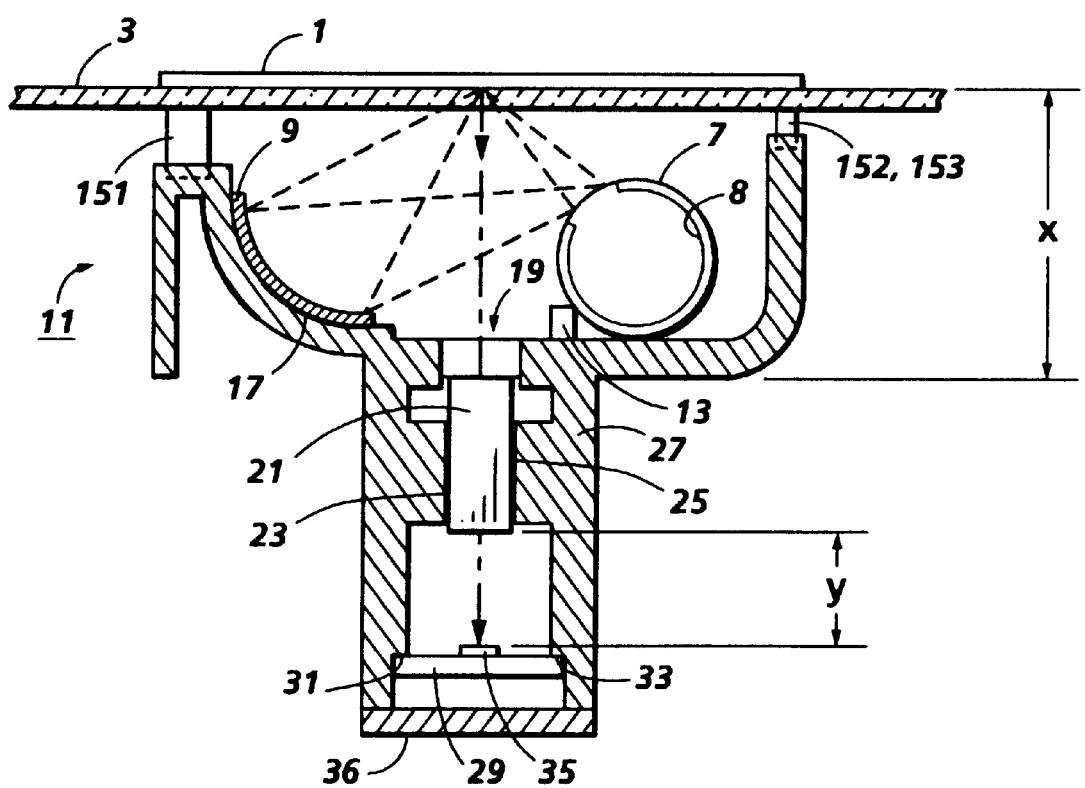
FIG. 4 illustrates a side view of a third embodiment of the illumination system for a document scanner according to the present invention.

FIG. 4 illustrates a third illumination system for a document scanner according to the concepts of the present invention. The structure and construction of the illumination device of FIG. 4 are substantially the same as described above with respect to FIGS. 2 and 3, except for an optical system registration section 27.

As illustrated in FIG. 4, the optical system registration section 27 is an integral part of the illumination registration device 11 forming a protrusion from the structures illustrated in FIGS. 2 and 3. The optical system registration section 27 includes lens registration surfaces 25 and 23 for registering and holding a lens 21 in proper alignment with the platen 3. Other features may be incorporated as an integral part of the illumination registration device 11 to further constrain the lens 21 position. For example such additional features may constrain the vertical position of the lens to correctly locate the lens in its best focus position. In other words, the optical system registration section 27 includes surfaces, protrusions, or indentations to register the lens with respect to the optical center line 6 of the illumination system and with respect the the illumination system's focus requirements.

The optical system registration section 27 also includes full width array sensor assembly location surfaces 31 and 33. The full width array sensor assembly location surfaces 31 and 33 provide a reference for properly registering a full width array sensor assembly 29 with a full width array sensor 35 under the lens 21. These surfaces 31 and 33 enable proper registration of the full width array sensor 35 with the optical center line 6 of the illumination system and in the desired image plane of lens 21. Moreover, these surfaces 31 and 33 may be protrusions, indentations, edges, or tabs as shown which abut alignment features in the full width array sensor assembly 29. A cover 36 may be attached under the full width array sensor assembly 29 to protect the full width array sensor 35 from undesirable light and contamination and to provide shielding of the associated electronic circuits from undesirable electrical emissions.

In FIG. 4, the distance between an upper lens surface and the document is "x". Also, the distance between a lower lens surface and the full width array sensor 35 is "y". In the preferred embodiment, the distance "x" is substantially equal to "y", and the lens 21 is a SELFOC™ lens having a 1:1 magnification ratio. SELFOC™ is a registered trademark of Nippon Sheet Glass Co., Ltd. However, the relationship between the distance "x" and "y" can be varied depending upon the magnification of the lens utilized in the system and optical conjugate corrections required by the presence of the platen and other glass surfaces.

The opposing reflector locating surface 17, as described above with respect to FIGS. 2, 3, and 4, is shaped in the same shape as the opposing reflector 9. This shape, as long as it matches the desired shape of the opposing reflector, may be of any desired shape or curvature. The actual shape of the opposing reflector 9 and opposing reflector locating surface 17 is any conventional design which provides the proper reflectance profile for the illumination system. Typical shapes include planar or cylindrical surfaces, with cylindrical surfaces having a second order equation (circular, elliptical or parabolic) describing the cross-section in the plane shown in FIG. 2.

The illumination registration devices 11, described in FIGS. 2, 3, and 4, each may be constructed of a molded polymer or plastic or a precast metal part wherein the mechanical tolerances needed for proper alignment are built into the device so that when an opposing reflector is registered to and attached to the opposing reflector locating surface 17 and a light source is registered to and attached to the lamp locating feature 13, proper reflector to lamp alignment is realized without the need for any additional manual adjustments. More specifically, the opposing reflector surface 17 and the lamp locating feature 13 may be preformed into the polymer, plastic, or metal so that the mechanical tolerances are already taken into account, thereby eliminating the need for additional manual adjustments to properly align light source 7 and the reflector 9. Alternately, the lamp locating feature 13 may be an accurately located opening or indentation into which an additional lamp holding or constraining element may be placed. This registration method substantially eliminates variances in an illuminator's profile from one illumination system to another.

The opposing reflector 9, in the preferred embodiment of the present invention, is a thin highly reflective tape. More specifically, an example is the reflective tape made by 3M™ having a product name ECP-305 having a reflectance value of 96%. In another embodiment of present invention, the reflective tape is the reflective tape described in co-pending U.S. patent application to Debra S. Vent, entitled "Reflective Tape" and having attorney docket number D/94512, executed and mailed on Dec. 1, 1994. The entire contents of this U.S. patent application are hereby incorporated by reference.

The reflective tape is applied to the opposing reflector locating surface 17 such that the reflective tape takes on the actual shape of the surface 17. in other words, the shape of the opposing reflector locating surface 17, in conjunction with the reflective tape, provides the desired reflective properties and profile needed in the illumination system. It is noted that the opposing reflector 9 may be a metal or other reflective material or material combination, such as a metal/dielectric combination or multi-layer dielectric coating, that is formed directly onto the opposing reflector locating surface 17 through conventional coating, deposition, or electroplating processes. Also, if the illumination registration device 11 is precast metal, the opposing reflector locating surface 17 may provide a surface that only requires polishing to form the opposing reflector 9.

As noted above, the illumination registration device 11 can be precast or molded such that the mechanical tolerances controlling the relative positions of the lamp, the reflector, the platen, the lens system, and the optical sensor can be designed into and produced in a single component, thereby avoiding tolerance stack up which occurs in the conventional multi-part assembly. More specifically, by designing the mechanical tolerances into a single unitary component, the present invention can easily meet the tight mechanical tolerances of an illumination system, thereby maintaining proper reflector to lamp alignment.

Moreover, by utilizing a reflective tape having a reflectance of 96%, the illumination system realizes a higher reflective efficiency and improved left to right illumination balance. Furthermore, should the illumination system become damaged; i.e., the opposing reflector becomes damaged; the damaged reflector can be restored to its original performance by applying a new strip of reflective tape. It is noted that depending on the nature of the damage, removal of the old strip of reflective tape may not be necessary.

It is noted that the present invention can be utilized in a document scanner that is a component of a digital copier wherein the reflected light (light reflected from the document) passing through the slit or opening 19 and an optical system 21 impinges upon a CCD sensor or full width array sensor. The CCD sensor or full width array sensor converts the received light into electrical signals or image data which represent the scanned image. The image data can then be processed, reproduced on an image recording medium, such as a document, displayed, or stored in an electronic, magnetic, or optical medium.

Also, the present invention can be utilized in a document scanner that is a component of a light lens or optical (analog) photocopying system wherein the reflected light (light reflected from the document) passing through the slit or opening 19 and an optical or lens system 21 impinges upon a photoreceptor. The photoreceptor converts the received light into a latent image formed by a pattern of electrical charges residing on the photoreceptor. The latent image can then be developed by marking material such as toner and transferred to a recording medium.

Furthermore, the present invention can be utilized in a digital or light lens copier. In the digital copier situation, the reflected light (light reflected from the image) passing through the slit or opening 19 impinges upon a CCD sensor or full width array sensor which converts the received light into electrical signals or image data which represent the scanned image. The image data can then be processed and/or displayed before being reproduced on a image recording medium, such as a document. In the light lens copier situation, the reflected light (light reflected from the image) passing through the slit or opening 19 impinges upon a photosensitive material which converts the received light into a latent image of electrical charges which represent the scanned image. The latent image data can then be developed with a marking material and transferred to a image recording medium, such as a document.

The present invention has been described in detail above; however, various modifications can be implemented without departing from the spirit of the present invention. For example, the preferred embodiment of the present invention has been described in detail with respect to a platen scanning system; however, the present invention can be readily implemented in a constant velocity transport system wherein the illumination system provides light to the document as it is passed by the scanner.

In recapitulation, the present invention provides a registration device which provides built-in registration locating surfaces that eliminate the need for manual adjustments during and after the assembly of an illumination system.

While the present invention has been described with reference to various embodiments disclosed herein before, it is not to be confined to the detail set forth above, but is intended to cover such modifications or changes as made within the scope of the attached claims.

What is claimed is:

1. An illumination registration device, comprising:
  a single unitary body having an opposing reflector location surface, a light source location surface, and an opening positioned between said opposing reflector location surface and said light source location surface, said opening enabling light reflected from a document to pass therethrough.

2. The illumination registration device as claimed in claim 1, wherein said body comprises a platen assembly location surface.

3. The multipurpose registration device as claimed in claim 1, wherein said body is molded plastic.

4. The multipurpose registration device as claimed in claim 1, wherein said body is molded polymer.

5. The multipurpose registration device as claimed in claim 1, wherein said body is precast metal.

6. A document scanner, comprising:
  a single unitary illumination registration member including an opposing reflector location surface, a light source location surface, and an opening positioned between said opposing reflector location surface and said light source location surface, said opening enabling light reflected from a document to pass therethrough;
  a light source abutting said light source location surface; and
  a reflective member abutting said opposing reflector location surface.

7. The document scanner as claimed in claim 6, wherein said illumination registration member is molded plastic.

8. The document scanner as claimed in claim 6, wherein said illumination registration member is molded polymer.

9. The document scanner as claimed in claim 6, wherein said illumination registration member is precast metal.

10. The document scanner as claimed in claim 6, wherein said reflective member comprises a reflective tape abutting said opposing reflector location surface.

11. The document scanner as claimed in claim 6, wherein said reflective member comprises a reflective coating applied to said opposing reflector location surface.

12. The document scanner as claimed in claim 6, wherein said light source comprises a lamp locating member and said light source location surface establishes a registration location for said lamp locating member.

13. The document scanner as claimed in claim 6, further comprising:
  a transparent platen assembly abutting said illumination member;
  said illumination member including a platen assembly registration member.

14. The document scanner as claimed in claim 6, further comprising:
  a photosensitive member located to receive light reflected from a document and passing through said opening.

15. The document scanner as claimed in claim 14, wherein said photosensitive member comprises a CCD sensor array.

16. The document scanner as claimed in claim 14, wherein said photosensitive member comprises a full width array sensor.

17. The document scanner as claimed in claim 14, further comprising:
  an optical system located so as to receive light reflected from the document prior to said photosensitive member receiving the light reflected from the document;
  said illumination registration member including an optical system location surface.

18. The document scanner as claimed in claim 14, wherein said illumination registration member includes a photosensitive member location surface.

19. The document scanner as claimed in claim 14, wherein said reflective member comprises a reflective tape abutting said opposing reflector location surface.

20. A copier, comprising:
  a single unitary illumination registration member including an opposing reflector location surface, a light source location surface, and an opening positioned between said opposing reflector location surface and said light source location surface, said opening enabling light reflected from a document to pass therethrough;
  a light source abutting said light source location surface;
  a reflective member abutting said opposing reflector location surface;
  a photosensitive member located to receive light reflected from a document residing on said transparent platen and passing through said opening; and
  means for reproducing an image corresponding to the light received by said photosensitive member.

21. The copier as claimed in claim 20, wherein said photosensitive member comprises a photoreceptor.

22. The copier as claimed in claim 20, wherein said photosensitive member comprises a CCD sensor array.

23. The copier as claimed in claim 20, wherein said photosensitive member comprises a full width array sensor.

24. The copier as claimed in claim 20, wherein further comprising:

an optical system located so as to receive light reflected from the document prior to said photosensitive member receiving the light reflected from the document;

said illumination registration member including an optical system location surface.

25. The copier as claimed in claim 20, wherein said illumination registration member includes a photosensitive member location surface.

26. The copier as claimed in claim 20, wherein said reflective member comprises a reflective coating applied to said opposing reflector location surface.

27. The copier as claimed in claim 20, wherein said light source comprises a lamp locating member and said light source location surface establishes a registration location for said lamp locating member.

28. The copier as claimed in claim 20, further comprising:

a transparent platen assembly abutting said illumination member;

said illumination member including a platen assembly registration member.

* * * * *